United States Patent
Hensley et al.

(10) Patent No.: US 9,604,695 B2
(45) Date of Patent: Mar. 28, 2017

(54) BICYCLE PEDAL WITH INTEGRATED SECURITY SYSTEM

(71) Applicant: PEDAL LOCK, LLC, Rocklin, CA (US)

(72) Inventors: Ryan G. Hensley, Rocklin, CA (US); Thomas Muller, Tustin, CA (US)

(73) Assignee: PEDAL LOCK, LLC, Rocklin, CA (US)

( * ) Notice: Subject to any disclaimer, the term of this patent is extended or adjusted under 35 U.S.C. 154(b) by 0 days.

(21) Appl. No.: 14/473,669

(22) Filed: Aug. 29, 2014

(65) Prior Publication Data

US 2016/0059918 A1    Mar. 3, 2016

(51) Int. Cl.

| B62H 5/00 | (2006.01) |
|---|---|
| B62M 3/08 | (2006.01) |
| B62H 5/20 | (2006.01) |
| E05B 67/00 | (2006.01) |
| E05B 73/00 | (2006.01) |
| E05B 37/02 | (2006.01) |

(52) U.S. Cl.
CPC ............... *B62M 3/08* (2013.01); *B62H 5/001* (2013.01); *B62H 5/20* (2013.01); *E05B 37/02* (2013.01); *E05B 67/003* (2013.01); *E05B 73/00* (2013.01); *E05B 73/0005* (2013.01); *Y10T 70/40* (2015.04); *Y10T 70/409* (2015.04); *Y10T 70/50* (2015.04)

(58) Field of Classification Search
CPC ... Y10T 70/5009; Y10T 70/40; Y10T 70/409; Y10T 70/402; Y10T 70/49826; Y10T 70/483; Y10T 70/50; Y10T 70/5004; Y10T 70/5872; Y10T 70/417; Y10T 70/435; Y10T 70/485; Y10T 70/489; Y10T 70/415; Y10T 70/491; Y10T 70/413; Y10T 70/424; Y10T 70/437; Y10T 70/452; E05B 73/0082; E05B 73/0005; E05B 73/0011; E05B 73/00; E05B 73/0017; E05B 73/0029; E05B 67/003; E05B 67/36; E05B 67/06; E05B 67/063; E05B 67/10; E05B 67/22; E05B 37/02; E05B 37/025; E05B 37/00; E05B 37/14; B62M 3/08; B62H 5/001; B62H 5/20
USPC ..... 70/233, 234, 225, 226, 227, 230, 22, 26, 70/30, 14, 18, 49, 58
See application file for complete search history.

(56) References Cited

U.S. PATENT DOCUMENTS

| 609,127 | A | * | 8/1898 | Stearns | B62H 5/10 70/236 |
|---|---|---|---|---|---|
| 3,009,348 | A | * | 11/1961 | Colbert | B62H 5/10 280/294 |
| 3,950,972 | A | * | 4/1976 | Bleier | B62H 5/003 70/234 |
| 4,086,795 | A | * | 5/1978 | Foster | B62H 5/003 70/233 |

(Continued)

*Primary Examiner* — David E Sosnowski
*Assistant Examiner* — Morgan McClure
(74) *Attorney, Agent, or Firm* — Mark Young, P.A.

(57) ABSTRACT

A locking bicycle pedal includes a ratcheting coiled cable with a male locking plug that mates with a female locking port. A lock, such as a resettable combination lock, secures and releases a catch that secures and releases the plug in the port. When locked in the port, the plug depresses a plunger which constrains a pawl that engages teeth of a toothed wheel of the spool. An optional tracker wirelessly emits GPS location data if a theft is detected.

15 Claims, 18 Drawing Sheets

(56) References Cited

U.S. PATENT DOCUMENTS

| | | | | | |
|---|---|---|---|---|---|
| 4,543,806 | A | * | 10/1985 | Papandrea | E05B 67/006 242/380 |
| 4,665,724 | A | * | 5/1987 | Sakai | E05B 67/006 70/30 |
| 4,776,188 | A | * | 10/1988 | Dalaba | B62H 5/003 70/233 |
| 4,807,453 | A | * | 2/1989 | Bernier | B62H 3/00 211/5 |
| 5,156,028 | A | * | 10/1992 | Jiang | E05B 67/006 70/18 |
| 5,404,735 | A | * | 4/1995 | Hsieh | E05B 45/005 70/233 |
| 5,960,652 | A | * | 10/1999 | Marmstad | E05B 73/0011 70/233 |
| 6,681,603 | B1 | * | 1/2004 | Yu | E05B 67/006 30/233 |
| 7,428,833 | B2 | * | 9/2008 | Tollefson | B60D 1/60 70/14 |
| 8,196,945 | B2 | * | 6/2012 | Hensley | B62H 5/003 280/259 |
| 8,890,689 | B2 | * | 11/2014 | Ezzo | E05B 73/0017 340/539.11 |
| 8,959,965 | B2 | * | 2/2015 | Gray | B62H 5/10 70/14 |
| 2006/0117820 | A1 | * | 6/2006 | Lanigan | B62D 33/0222 70/279.1 |
| 2007/0277569 | A1 | * | 12/2007 | Vitali | B62H 5/003 70/233 |
| 2008/0284650 | A1 | * | 11/2008 | MacIntosh | A63B 24/0021 342/357.57 |
| 2013/0036777 | A1 | * | 2/2013 | Lin | G01G 19/58 70/30 |

\* cited by examiner

BICYCLE PEDAL WITH INTEGRATED SECURITY SYSTEM

FIELD OF THE INVENTION

This invention relates generally to bicycles, and, more particularly, to a bicycle pedal having a retractable coiled cable with a mating lock and optional alarm and tracker.

BACKGROUND

Bicycles have become increasingly popular as a healthier and environmentally friendlier mode of transport. While cycles are most popular within campus towns, many major cities are continually improving cycling infrastructure to encourage cycling.

Unfortunately, fear of bicycle theft discourages bicycle use. Many bicycle theft victims do not bother to buy a replacement. Those that do purchase a replacement, tend to substantially taper use. Combating bicycle theft, therefore, is a necessary step toward increasing the use of this sustainable form of transport A consistent finding is that most stolen bicycles, regardless of theft location, are not locked at all, locked improperly or secured using a lock that requires little effort to break or remove. Some bicycles are stolen from places that are assumed to be a safe, when in reality they are not. Others are left unattended and unlocked for short periods of time. For example, sometimes people leave their bike unlocked for just a minute or two while they run into a store, only to find their bicycle gone when they exit. While all locks can be overcome if the opportunity is present and a thief is suitably equipped, inadequate locking practices create a situation conducive for the thief. Observing more-secure locking practices would, at the very least, reduce opportunistic thefts.

A reason why many bicycle owners do not bother to lock their bicycles whenever not in use is inconvenience. Carrying a conventional chain or cable and lock can be a hassle. Even if the bicycle has a basket or saddle, the sound of a chain or cable and lock rattling around in a basket or saddle or wrapped around the frame is enough to deter many bicyclists from consistently using such devices. Removing the lock and chain or cable from a basket or saddle or unwrapping it from a frame is tedious.

Another problem in preventing theft of a bicycle is that the wheels are easily detachable from the frame, and that unless both wheels and frame are secured, wheels can easily be carried away after being detached. The most secure locking method therefore is to lock the wheels and frame to each other and to an immovable object.

However, U-locks, which are en vogue, are not sized to lock both wheels and the frame to an immovable object. A U-lock is a rigid metal ring in the shape of the letter U. The U part of the lock attaches to a crossbar section, and for this reason they are also called D-locks. To lock the bicycle, one locks it physically to some other object, such as a bike rack securely in the ground, parking meter or a flagpole. At best, a typical U-lock will lock a rear wheel and frame to an immovable object. The rear wheel is more costly than the front wheel and more difficult to remove. Thus, one wheel, such as the front wheel, is typically left vulnerable to theft when a U lock is used.

To avoid theft of an unlocked front wheel, some bicycle owners will remove it and take it with them. Obviously, that is a hassle and impractical if there is no place to store the wheel.

What is needed is a convenient lock that is integrated with a bicycle and can secure a frame and at least one wheel, preferably both wheels. The lock should be useful and in conjunction with other locks. When the bicycle is being used for transportation, the lock should be inconspicuously stored without rattling and without scratching the frame.

The invention is directed to overcoming one or more of the problems and solving one or more of the needs as set forth above.

SUMMARY OF THE INVENTION

To solve one or more of the problems set forth above, in an exemplary implementation of the invention, a an exemplary bicycle pedal according to principles of the invention includes a pedal body providing a surface against which a user's foot may exert a force. A threaded spindle is rotatably coupled to the pedal body and configured for threaded engagement of a crank arm of a bicycle. Within the pedal body are a spool and axle. The spool and axle are concentric and the spool is rotatable about the axle. The axle is generally perpendicular to the surface of the pedal body against which a user's foot may exert a force. A security cable is wound on the spool. The security cable has a first free end with a male locking plug. A female locking port is provided in the pedal body. The port is sized to receive the male locking plug. A catch is provided in the female locking port. The catch is movable from a locked position to an unlocked position. In the locked position, the catch engages the plug when the plug is inserted in the port. A lock operably coupled to the catch is user configurable (i.e., may be locked or unlocked by a user) to a locked state and to an unlocked state. The lock prevents movement of the catch from the locked position to the unlocked position when the lock is in the locked state.

The lock may comprise a combination lock, such as, by way of example and not limitation, a combination lock having three rotating discs, wherein each rotating disc includes a central aperture and notch, and a toothed locking pin having three teeth. The rotating discs are rotatable about the toothed locking pin when the teeth of the locking pin are not within the notches of the discs. The pedal body may include a window. The combination lock may be within the pedal body, accessible through the window.

The spool may be part of a ratchet mechanism. In such an embodiment, the spool includes a toothed disc having a plurality of peripheral teeth. A pivoting pawl controllably engages peripheral teeth of the toothed disc as the spool rotates about the axle. The pawl is constrained from pivoting when the male plug is inserted in the female locking port. When the pawl is constrained, the pawl prevents rotation of the spool in a direction that would permit withdrawal of the security cable wound on the spool.

To constrain the pawl, a spring biased plunger is provided. The plunger has a first end in the female locking port, and a second end, opposite the first end, between the locking port and the pawl. The plunger is depressed by the male plug when the male plug is inserted in the female locking port. The second end is operable to constrain the pawl from pivoting when the plunger is depressed by the male plug when the male plug is inserted in the female locking port. In one implementation, a spring biased yoke moveable from a first position to a second position may be provided between the pawl and the second end of the plunger. The yoke may be linked to the pawl. The second end of the plunger urges the spring biased yoke from the first position to the second position, when the plunger is depressed by the male plug, when the male plug is inserted in the female locking port. The yoke constrains the pawl when the yoke is urged into the second position.

A pawl release operably coupled to the pawl pivots the pawl away from the teeth of the toothed disc when the pawl release is actuated. The pawl release may comprise a pawl release button actuated by pressing it.

A catch release operably coupled to the catch urges the catch into an unlocked position when the catch release is actuated and the lock is in the unlocked state. When urged into the unlocked position, the catch releases (i.e., no longer) engages the plug. This allows the plug to be withdrawn from the port. The catch release may comprise a catch release button actuated by pressing.

The locking mechanism may comprise a combination lock, such as a three-disc lock. A toothed locking pin linearly moves from a locking position to an unlocking position. The pin is operably coupled to the catch. When the lock is unlocked, the catch release urges the toothed locking pin into an unlocking position and the catch into an unlocked position when the catch release is actuated. When the lock is locked, the catch release cannot move the toothed locking pin or the catch release.

A lock reset is operably coupled to the toothed locking pin. The lock reset urges the toothed locking pin into a position whereby each tooth of the toothed locking pin is positioned in a notch of each disc when the lock reset is actuated. Each disc includes an outer ring that is rotatable relative to the central aperture of each disc. The position of the outer rings relative to the corresponding notches defines a combination for the combination lock. The combination corresponds to an arrangement of the discs in an unlocked state. The lock reset may comprise a button that is operably coupled to the toothed locking pin and actuated by pressing.

In one embodiment, a tracker is included in the pedal. The tracker transmits GPS location data when a theft condition is detected. An exemplary tracker includes a GPS receiver, a microcontroller operably coupled to the GPS receiver, a transmitter operably coupled to the microcontroller, an accelerometer operably coupled to the microcontroller, and a power supply operably coupled to the microcontroller. A switch operably coupled to the lock detects if the lock is in a locked state. If the lock is in a locked state and the accelerometer senses accelerations beyond a threshold, a theft condition is determined. In such as case, an alarm (e.g., audible alarm) may be sounded. Additionally, in such as case, the

BRIEF DESCRIPTION OF THE DRAWINGS

The foregoing and other aspects, objects, features and advantages of the invention will become better understood with reference to the following description, appended claims, and accompanying drawings, where:

Figure 1:
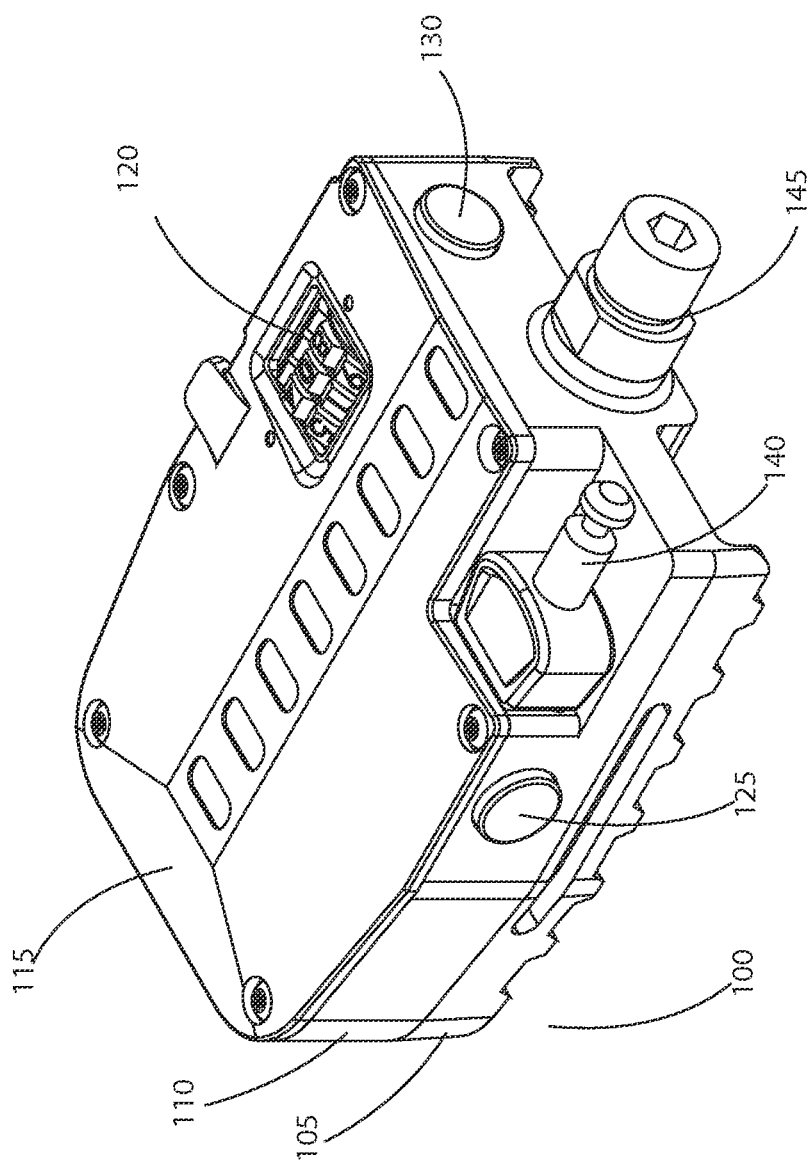
FIG. 1 is a top perspective view of an exemplary bicycle pedal having a retractable coiled cable with a mating lock according to principles of the invention.
Figure 2:
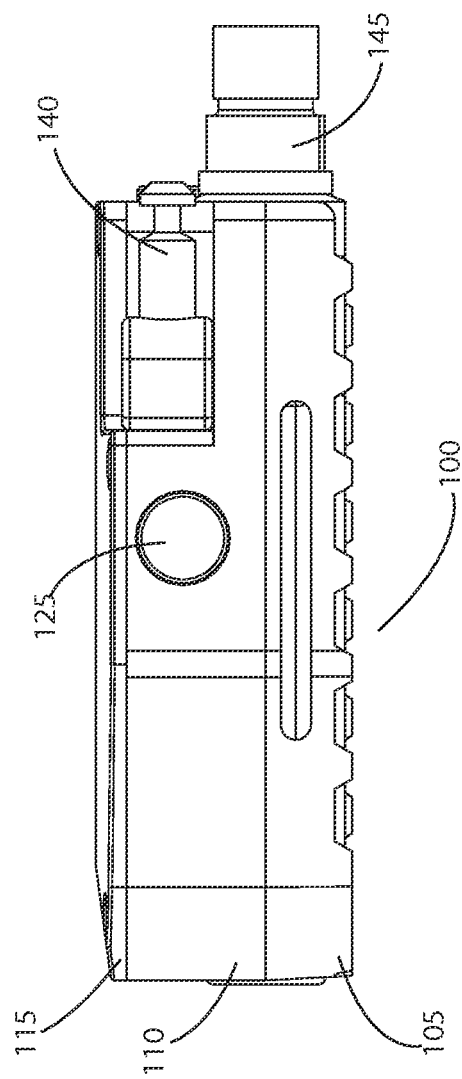
FIG. 2 is a first side view of an exemplary bicycle pedal having a retractable coiled cable with a mating lock according to principles of the invention.
Figure 3:
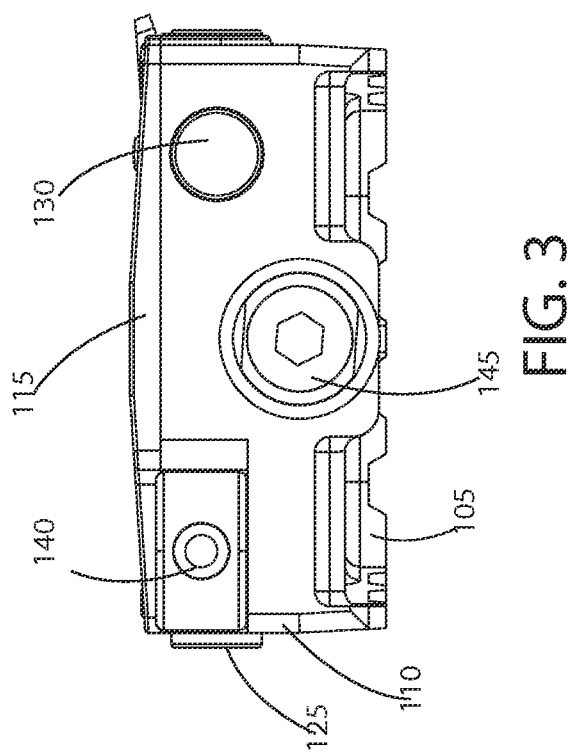
FIG. 3 is a medial side view of an exemplary bicycle pedal having a retractable coiled cable with a mating lock according to principles of the invention.
Figure 4:
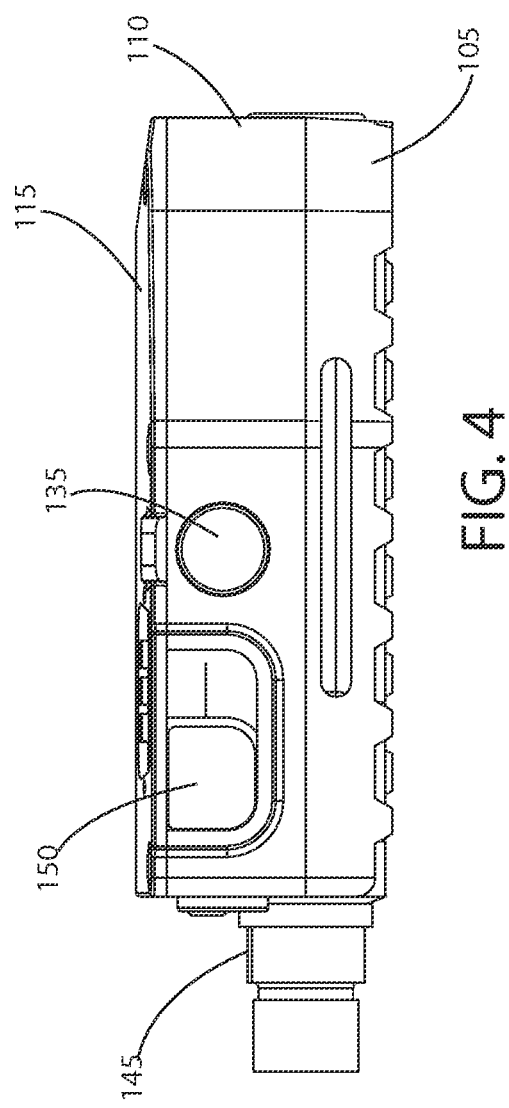
FIG. 4 is a second side view of an exemplary bicycle pedal having a retractable coiled cable with a mating lock according to principles of the invention.
Figure 5:
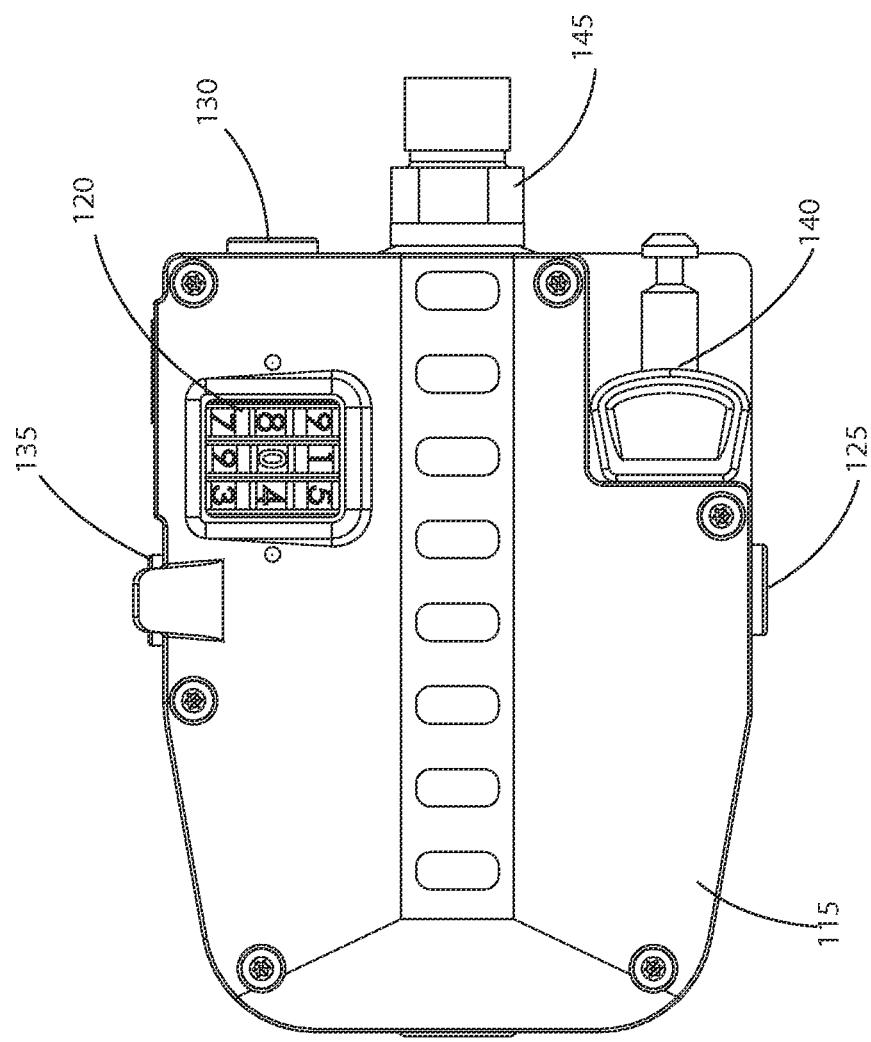
FIG. 5 is a plan view of an exemplary bicycle pedal having a retractable coiled cable with a mating lock according to principles of the invention.
Figure 6:
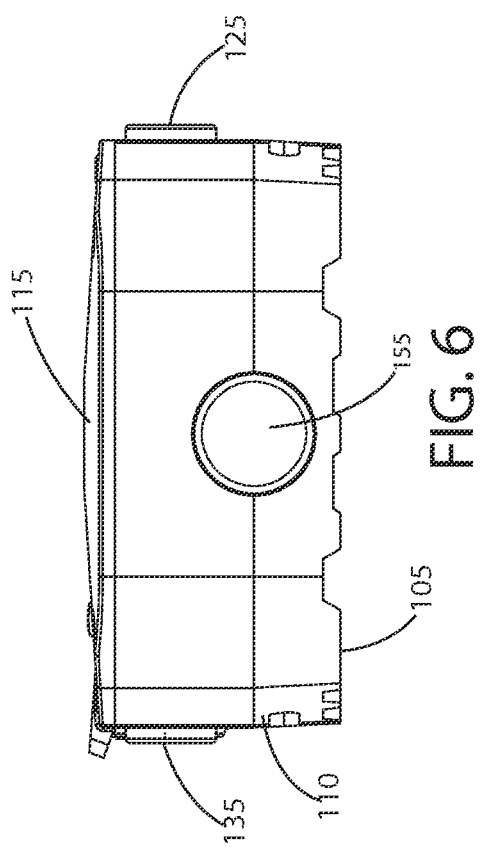
FIG. 6 is a lateral side view of an exemplary bicycle pedal having a retractable coiled cable with a mating lock according to principles of the invention.
Figure 7:
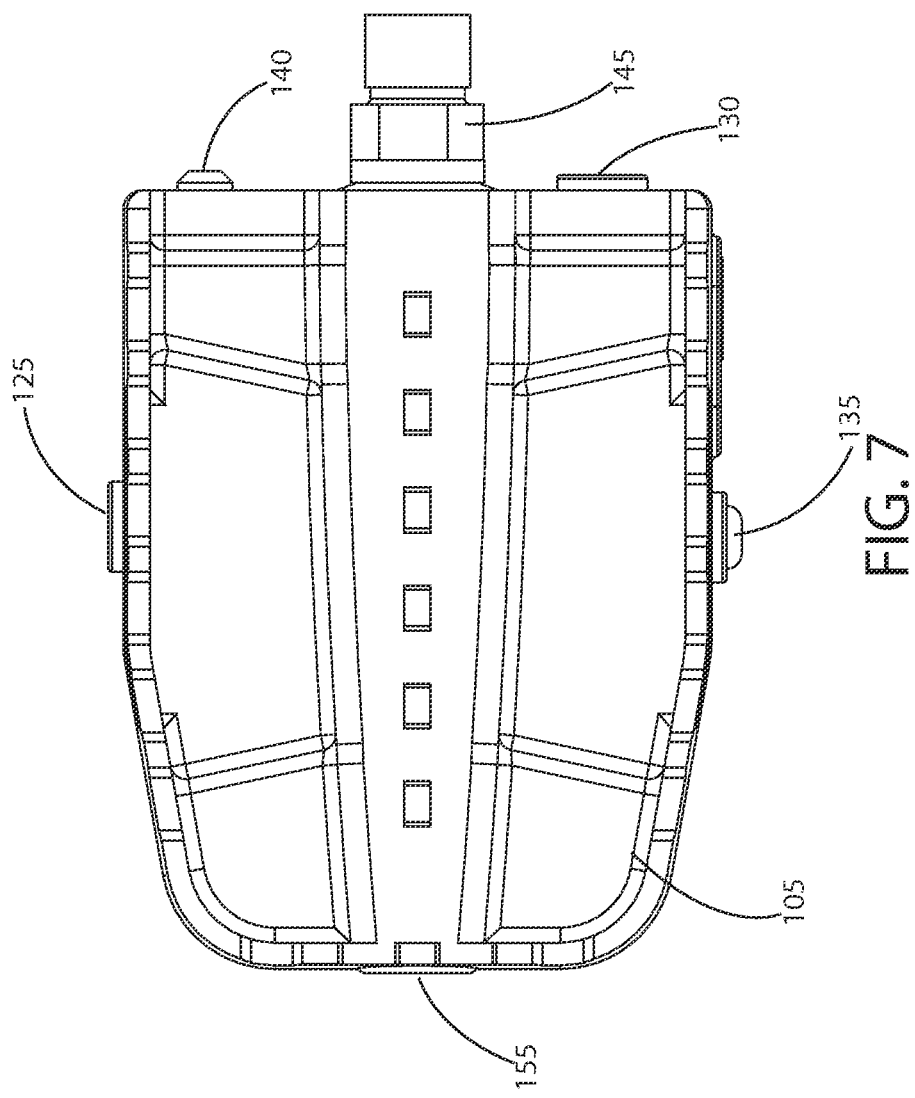
FIG. 7 is a bottom view of an exemplary bicycle pedal having a retractable coiled cable with a mating lock according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Referring to FIGS. 1 through 7, a bicycle pedal 100 with an integrated cable lock according to principles of the invention is shown. The pedal 100 comprises foot-operated platform for reciprocating motion propulsion of a bicycle. The pedal 100 provides a spindle 145 connection between the cyclist's foot and a crank, allowing a cyclist to turn a sprocket and propel the bicycle's wheels. The pedal 100 is free to rotate, on bearings, relative to the spindle 145. The spindle 145 connects to the end of a conventional bicycle crank. In the U.S., adult or multi-piece cranks typically have a 9/16-inch (14.2875 mm) hole with 20 threads per inch (TPI). One-piece or children's cranks in the U.S. use a ½-inch (12.7 mm) by 20 TPI hole. A right-side (usually the drive-side, i.e., the side with the sprocket) pedal spindle is right-hand threaded, and the left-side (usually the non-drive-side) pedal spindle is left-hand (reverse) threaded to help prevent it from becoming loose by precession. Thus, a pedal 100 according to principles of the invention may include a spindle adapted for use with any bicycles having industry standard cranks. One or more pedals of a bicycle may be replaced with a pedal 100 according to principles of the invention. Additionally, bicycles equipped with one or more of the pedals 100 as original equipment, may be supplied from a manufacturer.

A body comprised of bottom 105, intermediate 110 and top 115 is a generally somewhat rectangular shaped, and defines an internal compartment which contains components of the pedal 100. The pedal include a button 125 for releasing cable, a button 130 for releasing a lock and another button 135 for setting the lock. The exemplary lock is a rotating disc combination lock 120. A male locking plug 140 attached to a cable 141 plugs into a female port 151 behind sliding access panel 150. The sliding access panel prevents debris from entering the port 151, when the plug 140 is not inserted in the port 151. The pedal 100 may include any aesthetic features and foot gripping features, include textured surfaces to enhance traction.

The cable 141 is narrow width to provide flexibility during coiling, and sufficiently long to extend through components of the bicycle frame and wheels. While the invention is not limited to a particular cable length or width, a cable length of at least 2 feet, and preferably at least 3 feet is preferred. Likewise, a width of ¼-inch or less is preferred. In an embodiment where both pedals of a bicycle comprise pedals according to principles of the invention, the cable of each pedal may plug into the locking port of the other pedal.

Figure 8:
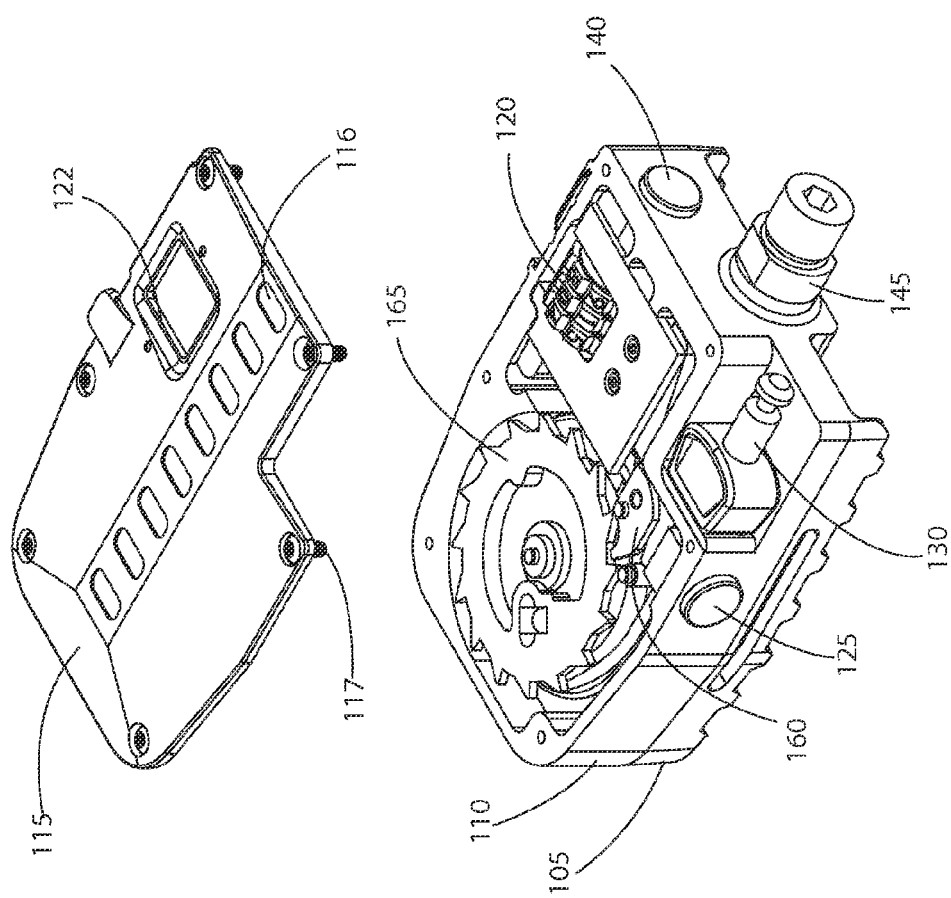
FIG. 8 is a top perspective view of a partially disassembled exemplary bicycle pedal having a retractable coiled cable with a mating lock according to principles of the invention.
Figure 9:
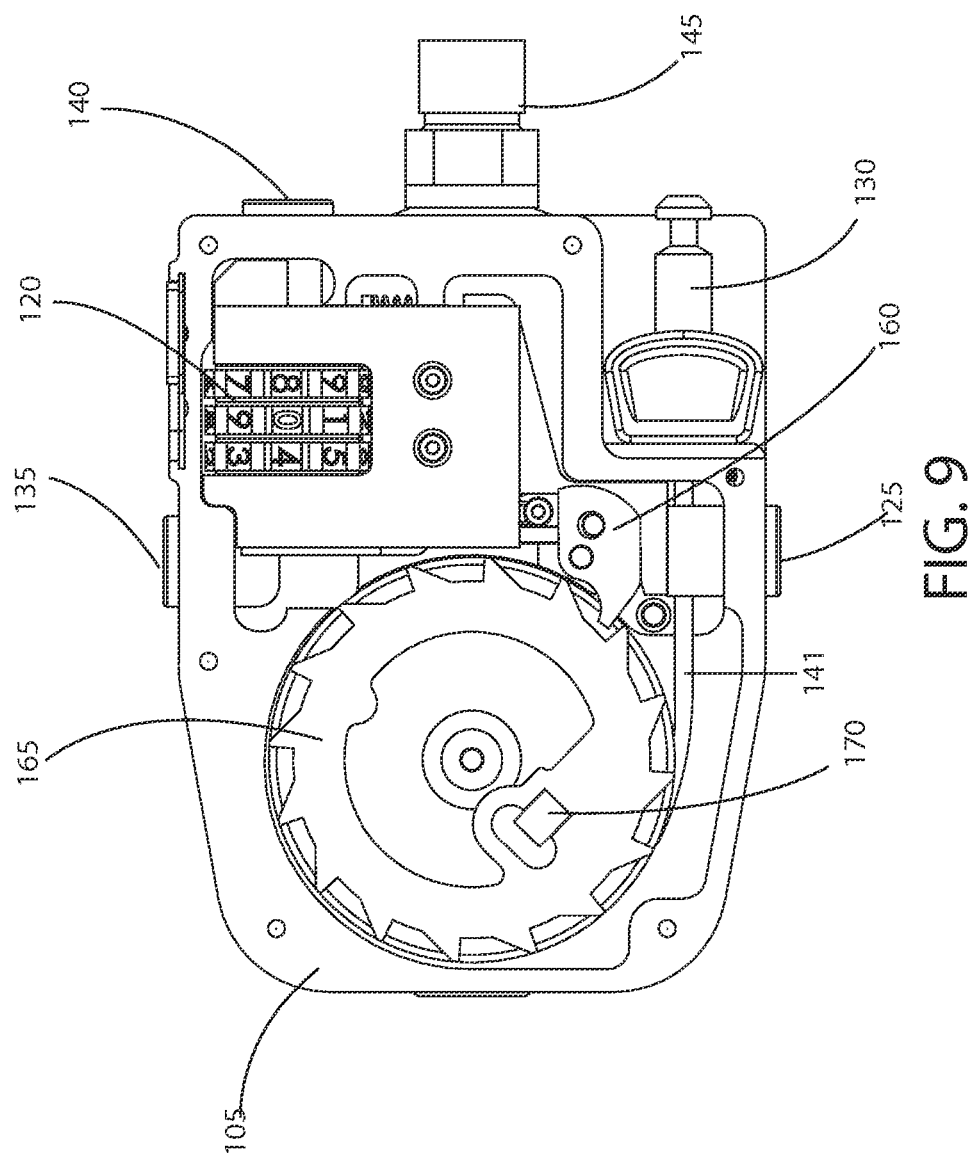
FIG. 9 is a plan view of an uncovered portion of an exemplary bicycle pedal having a retractable coiled cable with a mating lock according to principles of the invention.
Figure 11:
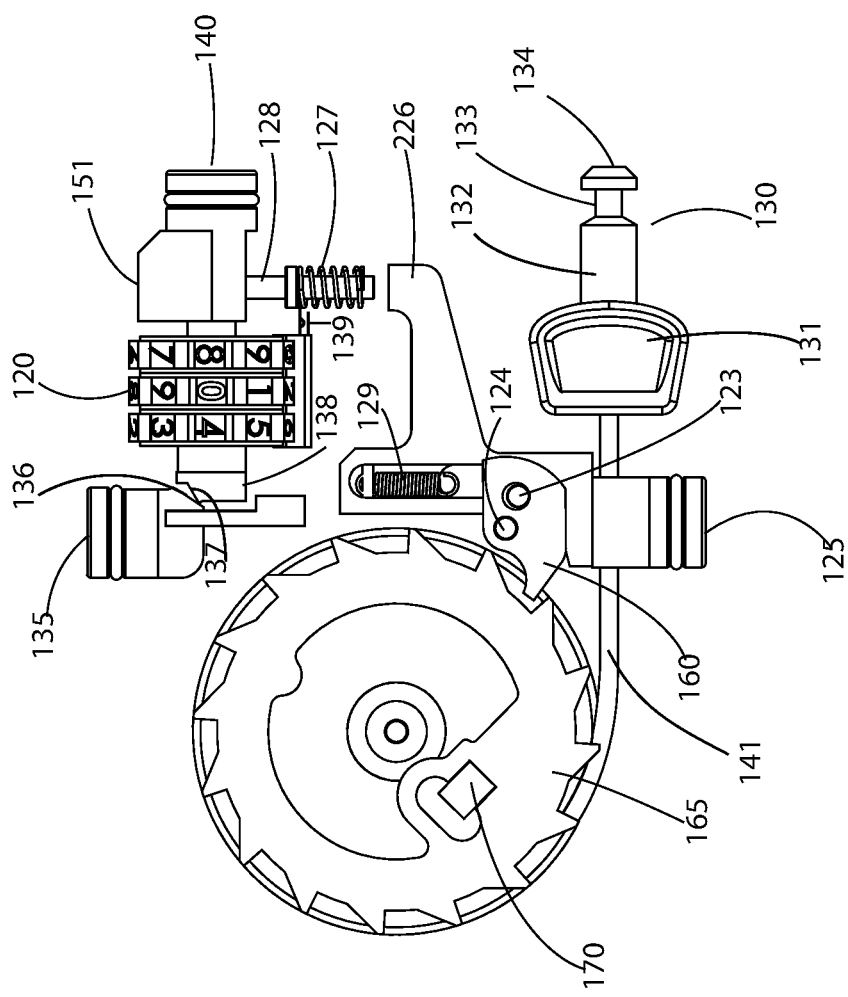
FIG. 11 is a plan view of uncovered mechanical components of an exemplary bicycle pedal having a retractable coiled cable with a mating lock according to principles of the invention.

In FIG. 8, the top 115 is removed. The recessed opening 122 in the top 115, prevents a user's foot from contacting the discs of the lock 120 when pedaling. A plurality of mechanical fasteners, such as threaded screws 117 secure the top 115 to mating threaded holes in the intermediate 110 and/or bottom 105 portions of the pedal 100. A ratcheting spool 165 contains a wound cable 141. The cable is fixedly attached at one end to the spool 165 and, at the other end, to the plug 130. A pawl 160 allows retraction but resists withdrawal of the cable 141 unless the pawl is pivoted away from the teeth of the spool 165. Such pivoting may be accomplished by pressing button 125, which is mechanically linked to the pawl in a manner that causes the pawl to pivot about pivot pin 124 (FIG. 11), by linear translation of coupling pin 123. When the plug 130 is inserted into the locking port 151, the tip 134 of the plug 130 presses against a plunger 128 biased by spring 127, which urges the plunger against yoke 226, which is biased by a spring 129. In this manner, the plunger 128 prevents movement of the yoke 226, which prevents depressing the button 125. Thus, in this manner, the pawl 124 remains locked when the plug 130 is inserted into the port 151. When the pawl 124 is locked, rotation of the spool 165 to allow withdrawal of cable 141 is prevented. This prevents a thief from extending the cable 141 to facilitate severing the cable 141.

Figure 10:
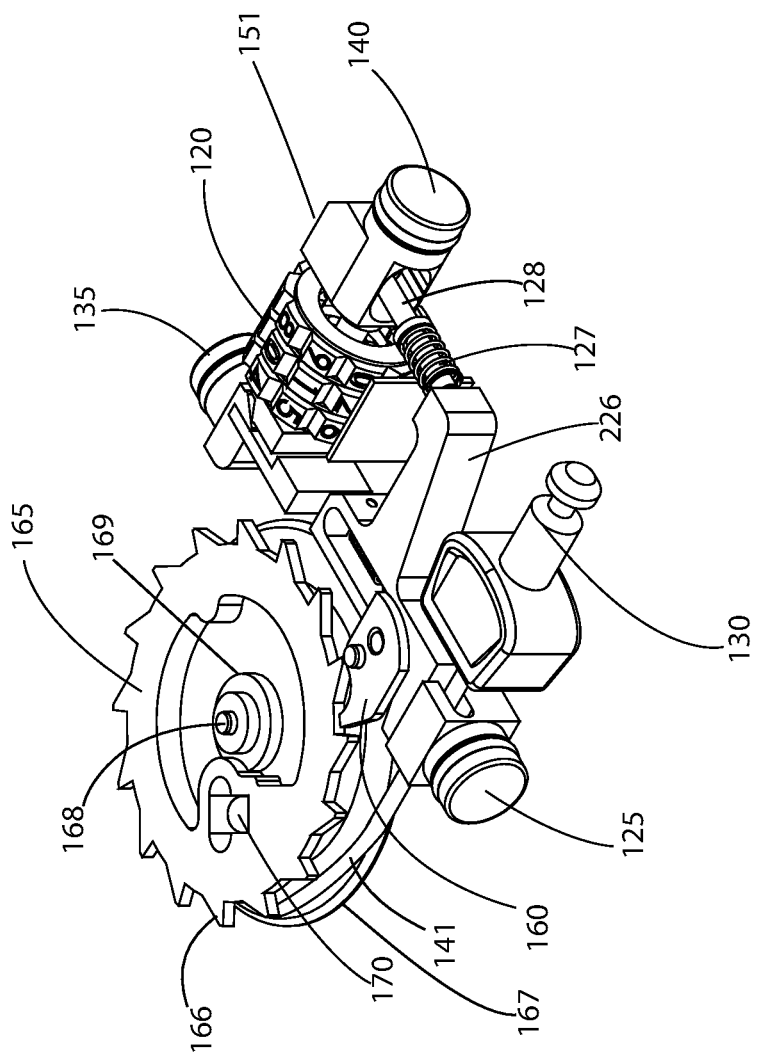
FIG. 10 is a perspective view of uncovered mechanical components of an exemplary bicycle pedal having a retractable coiled cable with a mating lock according to principles of the invention.

As illustrated in FIG. 10, the spool includes a top toothed disc 166 resembling a cog, a bottom disc 167, and a central cylindrical cord shaft 169 rotating about a concentric axle 168. The spool 165 may be manually rewound by feeding cable into the pedal assembly or may include a spring to facilitate rewinding. In an exemplary embodiment, a torsion spring 170 coupled to the spool allows sufficient rotations of the spool to unwind the entire cable length and facilitates rewinding by rotationally biasing the spool 165. The axis of rotation defined by the central axle 168 is generally perpendicular to the top 115 and bottom 105 surfaces of the pedal and orthogonal to the axis of the spindle 145.

In FIGS. 8 through 11, details of the male plug 130 are visible. The plug 130 includes a shaft 132, a neck 133 extending from the shaft 132, and a bulbous head 134. The neck 133 has a width (e.g., diameter) that is less than the diameter of the shaft 132. The bulbous head 134 defines the terminus of the plug 130. The head 134 may have a conical, frustoconical, ellipsoid or other wedge shape, with a pointed, rounded or flattened tip. The maximum width of the head 134 is about the same as the width (diameter) of the shaft 132. The shape of the head 134 is conducive for deflecting the catch 153 during insertion.

Figure 12:
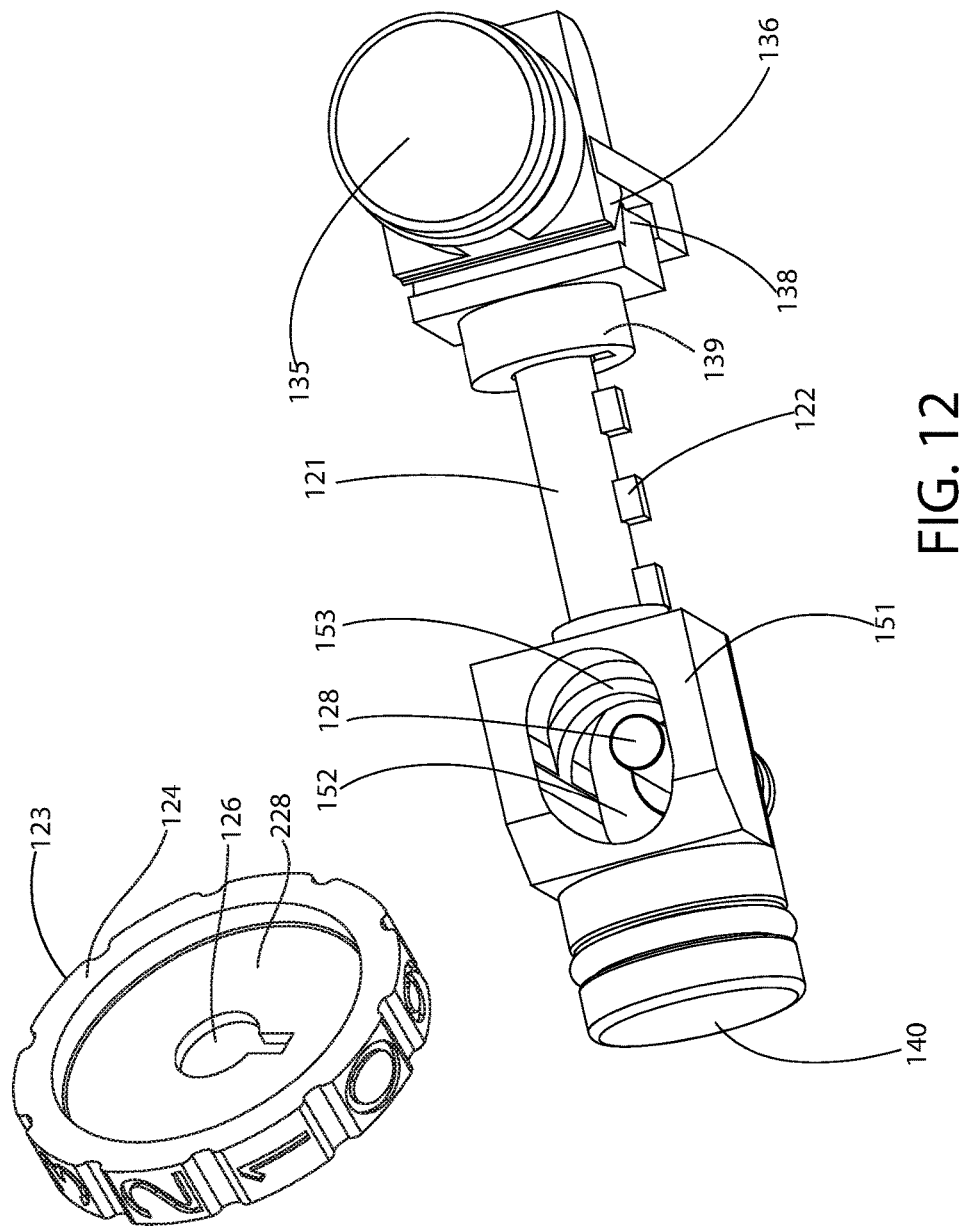
FIG. 12 is a perspective view of uncovered mechanical components of a mechanical locking mechanism for an exemplary bicycle pedal having a retractable coiled cable with a mating lock according to principles of the invention.

With reference to FIG. 12, during locking, the plug 130 is inserted in the cavity 152 of the port 151. A catch 153, such as a crescent shaped tab, bolt or other moveable retainer within the port 151 cavity 152, moves to a position that is flush against the neck 133, during locking. The larger diameter head 134 cannot pass the catch 153, during locking. Thus, the plug 130 is retained in the port 151 by the catch 153, during locking.

The catch 153 may be deflectable in one direction, i.e., toward the periphery of the port 151. Thus, the plug 130 may be inserted in the port 151, even when the catch 153 is in a locked position. During insertion, the wedge-shaped or conical-shaped head 134 of the plug 130 deflects the catch 153 toward the periphery enough for the head 134 to clear the catch. After the head 134 clears the catch 153, the catch 153 springs back to the undeflected position against the neck 133.

When unlocked, the catch 153 moves away from the neck 133 by a sufficient distance to clear the head 134. When unlocked, the plug 130 may be withdrawn from the cavity 152 of the port 151 without appreciable interference between the head 134 and the catch 153.

The locking mechanism 120 comprises a rotating disc lock. Each of a plurality of discs 123 has an outer band 124 and a center disc 228 with a central keyhole aperture 124 including a circular portion and a notch. The outer band 124 is rotatable relative to the center disc 228 to set the combination. The lock 120 is secured by a pin 121 with several teeth 122 on it which mate with the keyhole aperture 126 of each disc 123 when rotated to the unlocked combination. The pin 121 and teeth may move side to side when the lock 120 is in an unlocked state. To change the combination, the lock is positioned to the unlocked combination, achieving an unlocked state. Then the setting button 135 is pressed, which urges the wedge 136 against step 138, urging the pin 121 and teeth 122 within the corresponding keyhole aperture 126. Then the outer band 124 may be rotated relative to the center disc 228 which remains fixed in position by the mated teeth 122. Such rotation resets the combination.

When the notched keyhole opening 126 in the discs 128 align with the teeth 122 on the pin 121, the lock can be opened, by pressing the catch release button 140. The catch release button 140 is coupled to the catch 153, which is coupled to the pin 121. Pressing the button urges the catch 153 and pin 121 and teeth 122 towards the bushing 139. This motion is only possible when the keyhole opening 126 in the discs 128 align with the teeth 122 on the pin 121. Otherwise, the teeth 122 collide with the disc 128, thereby preventing releasing movement of the catch 153. When the catch 153 is released, the lock 120 is in the unlocked state and the plug 130 may be removed from the cavity 152 of the port 151.

Figure 14:
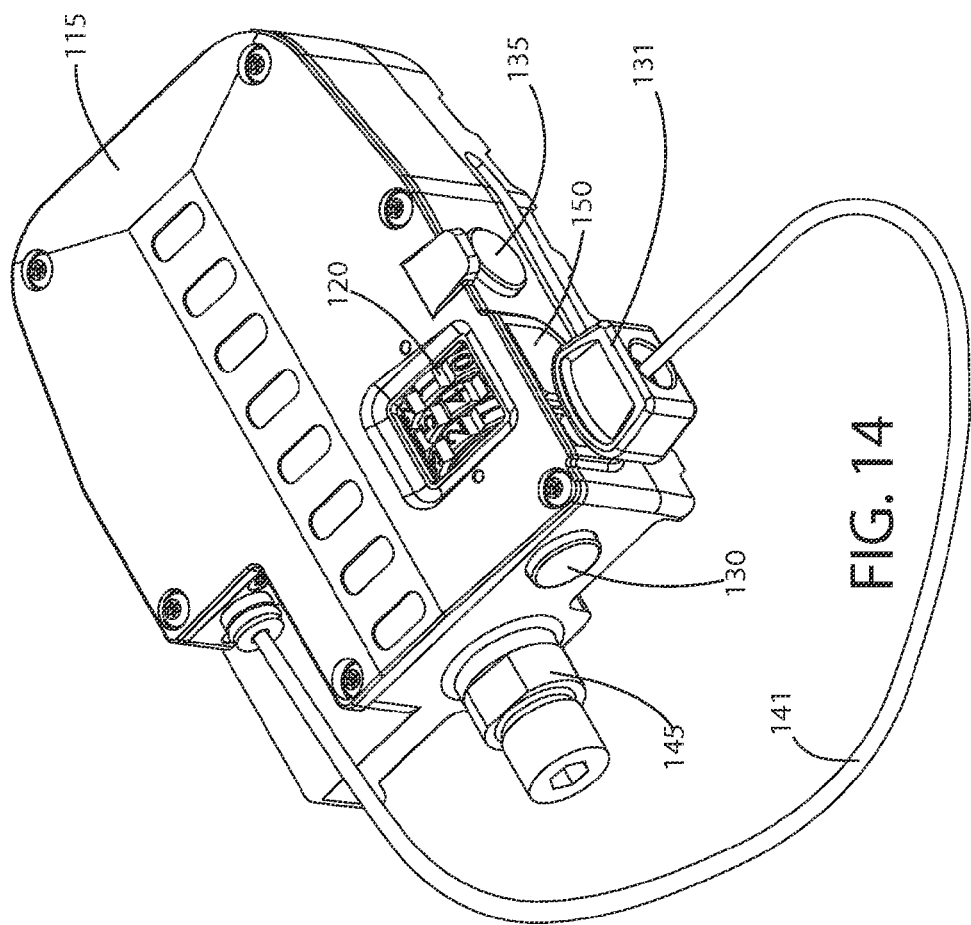
FIG. 14 is a top perspective view of an exemplary bicycle pedal having a retractable coiled cable with a mating lock, and the cable in a locked state, according to principles of the invention.

As described above, the locked and unlocked states affect several components. In the locked state, the pawl 160 remains locked, which prevents further withdrawal of the cable 141, as illustrated in FIG. 14. In the locked state, the catch 153 remains locked, which prevents withdrawal of the plug 130 from the cavity 152 of the port 151. In the locked state, the teeth 122 are not mated with the keyhole opening 126 in the discs 128, which prevent resetting the combination because the band 124 and disc 126 will rotate together. In the locked state, the cable 141 may wrap around one or more structures of the bicycle (e.g., front and rear wheels) and a security structure such as an abutting bicycle rack or utility pole.

Figure 13:
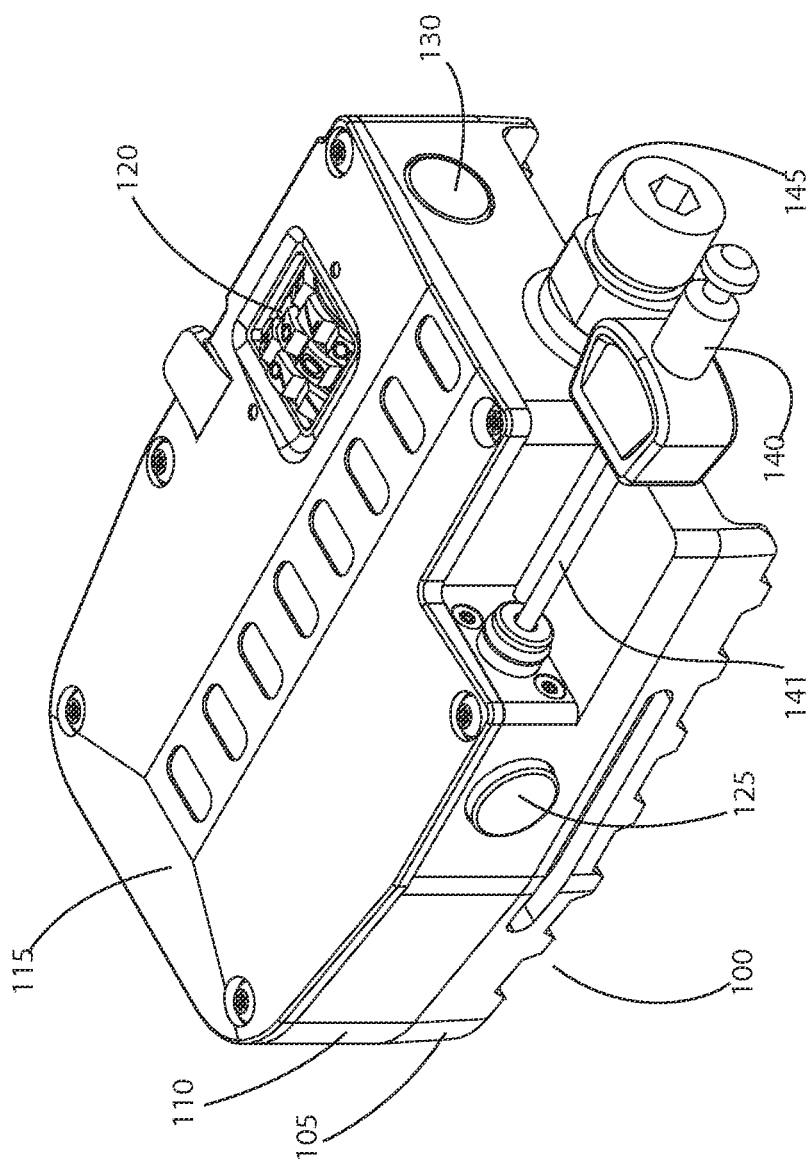
FIG. 13 is a top perspective view of an exemplary bicycle pedal having a retractable coiled cable with a mating lock, and the cable in a partially extended state, according to principles of the invention.

In the unlocked state, the ratchet release button 125 actuates the pawl 160. When pressed, the button 125 releases the pawl 160 by causing it to pivot. When the pawl 160 is released, cable 141 may be withdrawn (i.e., extended) from the spool 165, as illustrated in FIG. 13. In the unlocked state, the combination set button 135 may be depressed to allow the combination lock 120 to be set. In the unlocked state, the catch release button 140 may be depressed, moving the catch 153 to a released position, which allows withdrawal of the plug 130 from the cavity 152 of the port 151.

Figure 15:
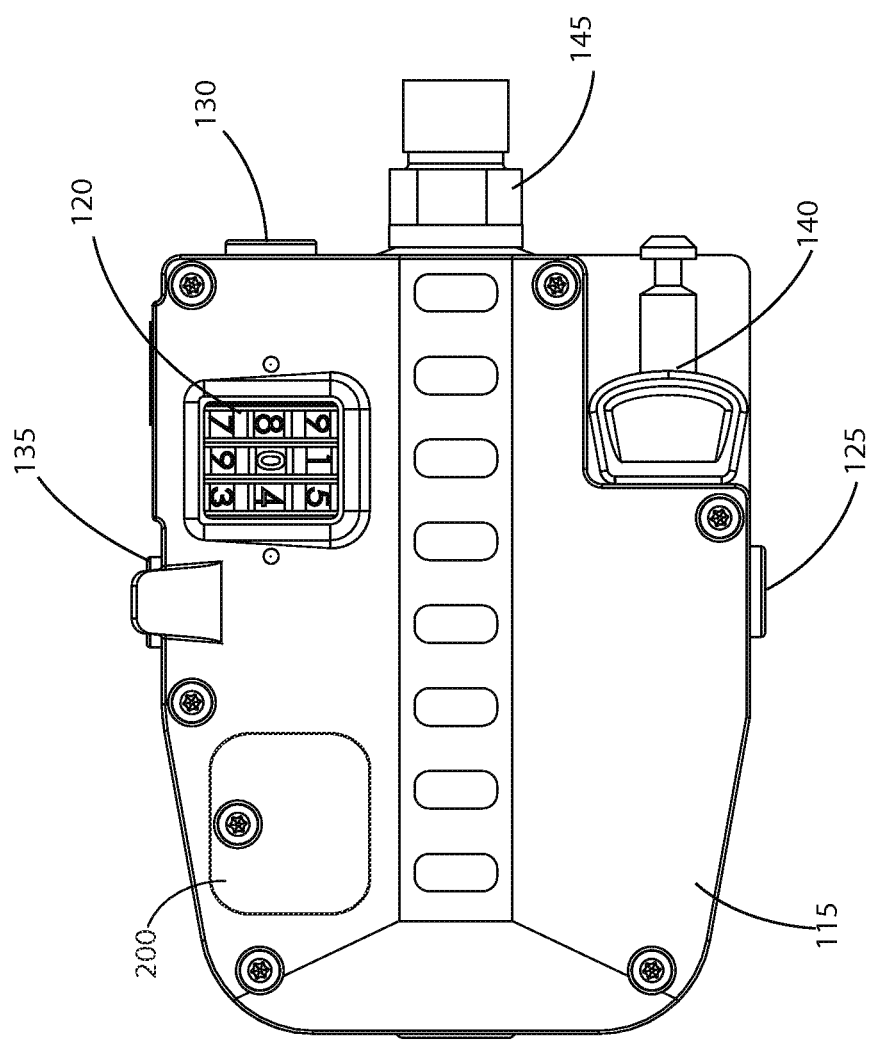
FIG. 15 is a plan view of an exemplary bicycle pedal having a retractable coiled cable with a mating lock, and an electronics module, according to principles of the invention.
Figure 16:
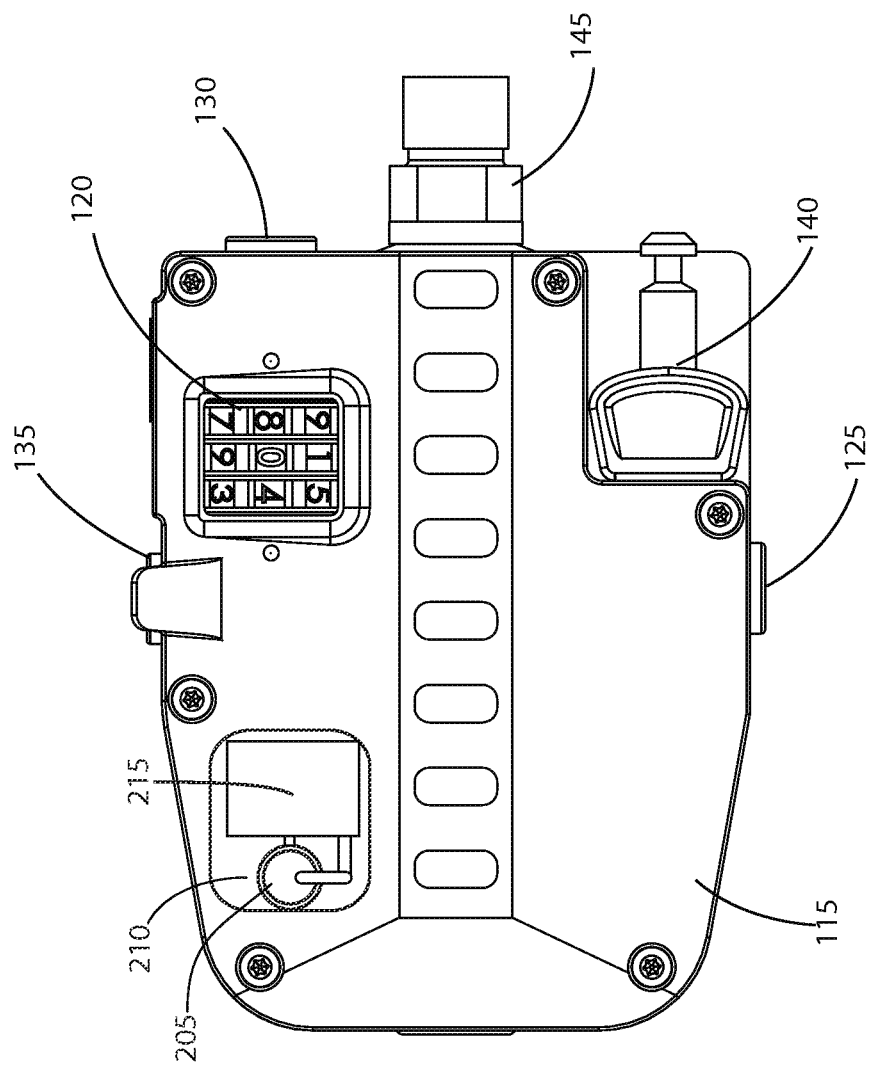
FIG. 16 is a plan view of an exemplary bicycle pedal having a retractable coiled cable with a mating lock, and an exposed electronics module, according to principles of the invention.
Figure 17:
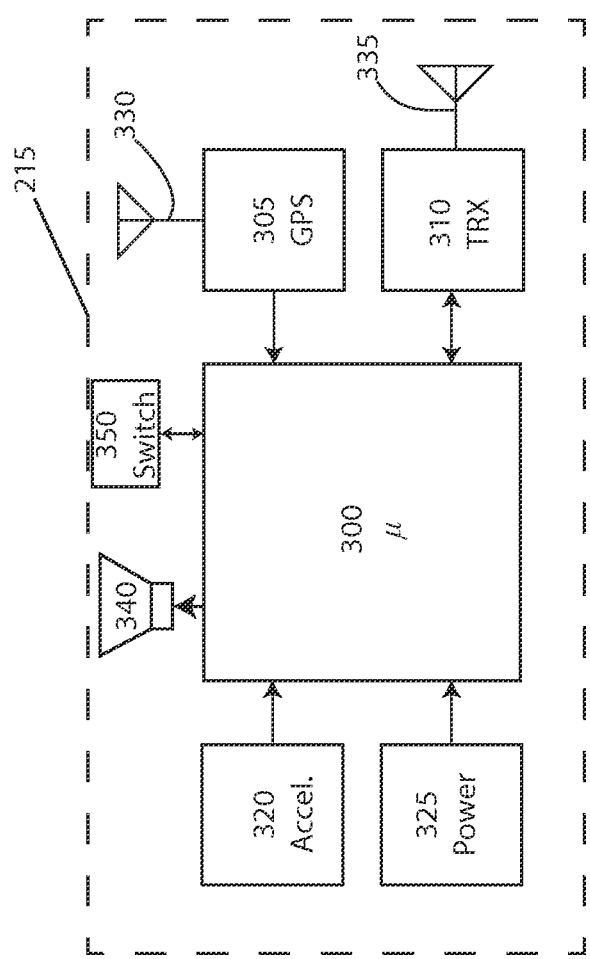
FIG. 17 is a high level schematic for an electronics module, according to principles of the invention.

With reference to FIGS. 15 through 17, optionally the pedal 100 may include a tracker 215 and battery 205 contained in a compartment 210 out of the way of the rotating spool 165. The compartment 210 may be accessible via a removable access panel 200, to facilitate replacing the battery 205. The battery 205, may be rechargeable or disposable. The tracker 215 may be concealed when the access panel 200 is removed, but is shown in FIG. 16 to facilitate understanding. The tracker 215 contains an acceleration sensor 320 which wakes up the microcontroller 300 when the tracker 215 is moved. In a sleep state, the tracker 215 minimizes power consumption, awaiting only a theft indication and an acceleration signal.

A theft indication occurs when the cable has been compromised (e.g., severed). A theft indication may be determined in one of several ways. For example, an acceleration detected while the plug 130 is locked in the port 151 suggests that the cable has been compromised, and may constitute a theft indication. In such a case, the status of the plug 130 is monitored and acceleration signals are monitored to determine a theft indication. The status of the plug may be monitored using one or more switches 350, such as electromechanical, magneto-mechanical or optical switches.

Illustratively, movement of the plunger 128 upon insertion of the plug 130 in the port 151 may trigger an operably coupled switch 139. The tracker 215 may monitor the state of the switch 139. When the switch 139 is in a state indicating that the plug is inserted, the tracker 215 monitors acceleration signals. When the switch 139 is in a state indicating that the lock 120 has been unlocked and the plug 130 removed from the port 151, then the tracker may remain in a sleep state or powered down state to conserve battery power. As another example, the plug 130 may be conductive and complete the conductive path from the plunger 128 to the catch 153. If a threshold acceleration is detected while the plug 130 is inserted in the port 151, thereby completing the conductive path from the plunger 128 to the catch 153, the alarm is sounded. This would indicate that the cable has been compromised and a theft is occurring. In yet another embodiment, a magnetic security sensor may be provided in or adjacent to the port 151, and the plug 130 may be magnetic or have a magnetic component. When inserted in the port 151, the plug 130 is detected by the magnetic sensor. If a threshold acceleration is detected when the plug 130 is detected by the magnetic sensor, the alarm is sounded. Again, this would indicate that the cable has been compromised and a theft is occurring.

When awakened, due to a theft indication, the tracker 215 periodically detects location using a GPS receiver 305 and antenna 330 operably coupled to the microcontroller 300. A wireless transceiver 310 (e.g., GSM transceiver) transmits a data via antenna 335 to a remote computing device, i.e., a monitoring station. The remote computing device may be a server, personal computer, phone, pda or other device capable of receiving and processing data transmitted via a GSM or other cellular communications network and/or the Internet.

Optionally, an audible alarm may be emitted through a loudspeaker 340 in response to a theft indication, e.g., if the tracker is moved (i.e., accelerated beyond a threshhold acceleration) when the plug 130 is contained in the cavity 152 of the port 151.

To avoid false alarms, a threshold acceleration may be established for a theft indication. The threshold acceleration may comprise accelerations of a certain magnitude for a certain a duration. In this manner, the tracker 215 may avoid alarms and battery consumption when the locked pedal is merely jostled.

The power supply components 325 of the tracker may comprise one or more batteries, such as battery 205, which may be rechargeable or disposable. In the case of a rechargeable battery 205, one or more charging sources (e.g., photovoltaic cells or generators) may be operably coupled to the battery 205.

Figure 18:
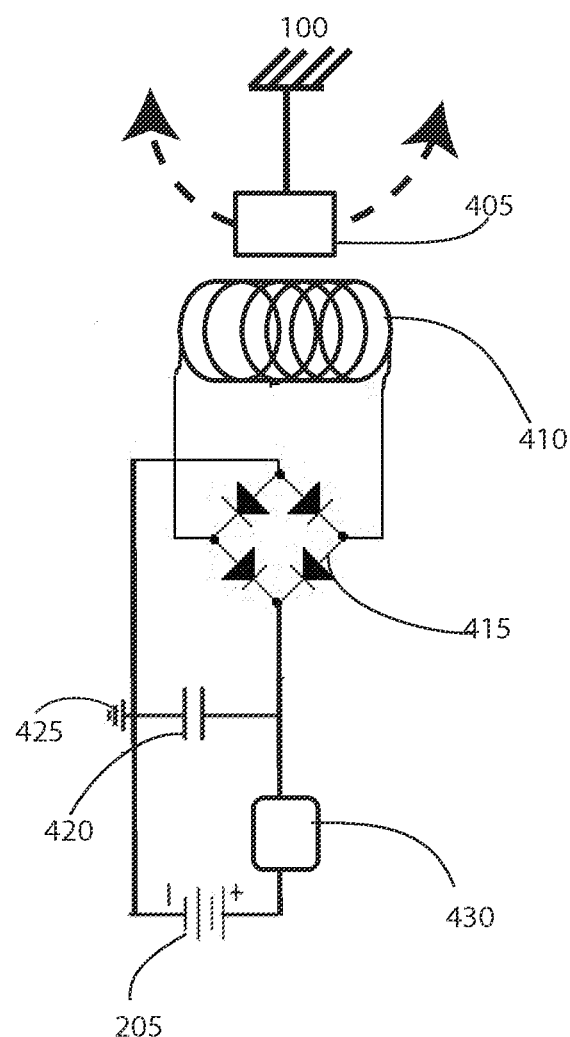
FIG. 18 is a high level block schematic conceptually illustrating an electrical power generator for a bicycle pedal according to principles of the invention.

By way of example and not limitation, one charging source may comprise a generator such as a pendulum generator. With reference to FIG. 18, an exemplary pendulum generator 400 is comprised of a pendulous magnet 405 pivotally attached the pedal 100 (or to a structure such as a housing attached to the pedal 100) in a manner that permits pendulous motion of the magnet 405 relative to the pedal 100 and relative to the coil 410. Pendulous motion is induced by motion of the pedal 100. An inductive coil 410 is positioned in proximity to the magnet 405. The pendulum generator 400 thus uses electromagnetic induction to convert mechanical pendulous motion of the magnet 405 relative to the coil 410 into alternating current (AC). As a result of the pendulous motion and attendant changes in direction of motion, the resulting current is an alternating current. Accelerations, decelerations, bumps and turns of an equipped bicycle pedal will all initiate pendulous motion for electric generation. Through the use of a rectifier 415, the induced alternating current, which periodically reverses direction, is converted to direct current (DC). Optionally, the output of the rectifier may be smoothed by an electronic filter, such as smoothing capacitor 420 coupled to a ground 425, to produce a steady current. The invention is not limited to a particular rectifier or filter. A battery charging circuit 430 uses the conditioned DC current to charge a rechargeable battery 205. The recharging circuit may be any type of charging circuit suitable for charging the battery and preventing overcharging of the battery. A nonlimiting example is a window comparator, which allows charging when the battery voltage drops beyond a preset value, and prevents charging when an upper preset voltage is attained. The battery charging circuit 430 may operate independently of the microcontroller 300, so that the battery 205 may be maintained in a charged state even while the microcontroller 300 is powered down or in a sleep state.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A bicycle pedal comprising:
   a pedal body providing a surface against which a user's foot may exert a force, a first side of the pedal body, and a second side of the pedal body opposite the first side of the pedal body;
   a threaded spindle rotatably coupled to the pedal body, the pedal body being rotatable relative to the spindle about an axis extending through the spindle, the spindle being configured for threaded engagement of a crank arm of a bicycle;
   a sole spool and axle, said sole spool and axle being concentric, and said sole spool being rotatable about said axle, and said axle being generally perpendicular to the surface of the pedal body against which a user's foot may exert a force and being generally perpendicular to the axis extending through the spindle;
   a security cable wound on the sole spool, the security cable having a first free end with a male locking plug;
   a female locking port fixed in the pedal body, said female locking port being sized to receive the male locking plug; and
   a catch in the female locking port, the catch being movable from a locked position to an unlocked position, and
   a lock operably coupled to the catch, said lock being user configurable to a locked state and to an unlocked state, and said lock preventing movement of the catch from the locked position to the unlocked position when the lock is in the locked state, said lock comprising a combination lock, said combination lock comprising three rotating discs, each rotating disc including a central aperture and notch, and a toothed locking pin having three teeth, and the rotating discs being rotatable about the toothed locking pin when the teeth of the locking pin are not within the notches of the discs, said pedal body including a window, and said combination lock being accessible through said window.

2. The bicycle pedal according to claim 1, said sole spool including a toothed disc having a plurality of peripheral teeth, and said pedal further comprising a pivoting pawl, said pawl controllably engaging peripheral teeth of the toothed disc as the sole spool rotates about the axle.

3. The bicycle pedal according to claim 2, said pawl being constrained from pivoting when the male plug is inserted in the female locking port, and, when said pawl is constrained, said pawl preventing rotation of the sole spool in a direction that would permit withdrawal of the security cable wound on the sole spool.

4. The bicycle pedal according to claim 3, further comprising a spring biased plunger having a first end in the female locking port, and said plunger being depressed by the male plug when the male plug is inserted in the female locking port, and said plunger having a second end opposite the first end, and said second end being operable to constrain the pawl from pivoting when the plunger is depressed by the male plug when the male plug is inserted in the female locking port.

5. The bicycle pedal according to claim 4, further comprising a spring biased yoke linearly moveable from a first position to a second position, and said yoke being linked to said pawl, and said yoke including a first contact surface and a second contact surface, the first contact surface being separate and apart from the second contact surface, and the first contact surface being in alignment with and adjacent to said second end of said plunger, and said second end of said plunger contacting the first contact surface and urging the spring biased yoke linearly from the first position to the second position when the plunger is depressed by the male plug when the male plug is inserted in the female locking port, and said yoke constraining the pawl when the yoke is urged into the second position, and said second contact surface engaging a release button, said release button being moveable to urge the spring biased yoke linearly from the second position to the first position when the plunger is not depressed by the male plug when the male plug is not inserted in the female locking port, and said yoke releasing the pawl to pivot when the yoke is urged into the first position, the release button extending from the first side of the pedal body, and the female locking port being fixed in the second side of the pedal body.

6. The bicycle pedal according to claim 5, further comprising a catch release operably coupled to the catch, and urging the catch into an unlocked position when the catch release is actuated and the lock is in the unlocked state.

7. The bicycle pedal according to claim 6, said catch release comprising a catch release button actuated by pressing.

8. The bicycle pedal according to claim 5, the toothed locking pin being linearly movable from a locking position to an unlocking position, and said pedal further comprising a catch release operably coupled to the locking pin and said locking pin being operably coupled to the catch, and said catch release urging the toothed locking pin into an unlocking position and the catch into an unlocked position when the catch release is actuated and the lock is in the unlocked state.

9. The bicycle pedal according to claim 8, said catch release comprising a catch release button actuated by pressing.

10. The bicycle pedal according to claim 5, further comprising a lock reset operably coupled to the toothed locking pin and urging the toothed locking pin into a position whereby each tooth of the toothed locking pin is positioned in a notch of each disc when the lock reset is actuated, and each disc further comprising an outer ring that is rotatable relative to the central aperture of each disc and defining a combination for the combination lock, said combination corresponding to an arrangement of the discs in an unlocked state.

11. The bicycle pedal according to claim 10, said lock reset comprising a lock reset button actuated by pressing.

12. The bicycle pedal according to claim 5, said plug comprising a shaft, a head, and a neck extending between the shaft and head, said shaft having a shaft width, and said neck having a neck width, and said head, having a head width, and said neck width being less than the head width and less than the shaft width.

13. The bicycle pedal according to claim 12, said head including a free end having a surface shape from the group consisting of a wedge-shaped surface, a conical shaped surface, a frustoconical shaped surface, and an ellipsoid shaped surface, said free end contacting the catch during insertion of the plug in the female port.

14. The bicycle pedal according to claim 5, further comprising a tracker comprising a GPS receiver, a microcontroller operably coupled to the GPS receiver, a transmitter operably coupled to the microcontroller, an accelerometer operably coupled to the microcontroller, and a power supply operably coupled to the microcontroller.

15. The bicycle pedal according to claim 5, further comprising a switch operably coupled to the lock and detecting if the lock is in a locked state.

* * * * *